United States Patent
Brammer

(10) Patent No.: US 6,807,863 B2
(45) Date of Patent: Oct. 26, 2004

(54) VIBRATION PICKUP COMPRISING A PRESSURE SLEEVE

(75) Inventor: Hartmut Brammer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 10/149,834

(22) PCT Filed: Dec. 14, 2000

(86) PCT No.: PCT/DE00/04470

§ 371 (c)(1),
(2), (4) Date: Feb. 19, 2003

(87) PCT Pub. No.: WO01/44771

PCT Pub. Date: Jun. 21, 2001

(65) Prior Publication Data

US 2003/0154765 A1 Aug. 21, 2003

(30) Foreign Application Priority Data

Dec. 15, 1999 (DE) .......................................... 199 60 325

(51) Int. Cl.[7] .............................................. G01L 11/00
(52) U.S. Cl. ...................................................... 73/702
(58) Field of Search ........................ 73/702–704, 35.11, 73/35.12, 35.13, 649, 652, 654, 721, 727; 310/324–340

(56) References Cited

U.S. PATENT DOCUMENTS

| | | | | |
|---|---|---|---|---|
| 4,838,090 A | * | 6/1989 | Hestich | 73/738 |
| 4,984,467 A | * | 1/1991 | Haefner | 73/721 |
| 5,744,698 A | | 4/1998 | Genot | |
| 6,279,381 B1 | * | 8/2001 | Brammer et al. | 73/35.11 |
| 6,739,182 B2 | * | 5/2004 | Mueller et al. | 73/35.11 |

FOREIGN PATENT DOCUMENTS

DE          44 03 660          10/1994

* cited by examiner

*Primary Examiner*—William Oen
(74) *Attorney, Agent, or Firm*—Kenyon & Kenyon

(57) ABSTRACT

A vibration meter having a pressure sleeve is proposed, in which the pressure sleeve may be mounted under pressure at a bottom surface on a component causing vibrations, and the bottom surface has a contour, prior to mounting, which runs radially inward in a concave manner. Furthermore, prior to mounting, the bearing surface has a contour, which runs radially inward in a concave manner, the contour being dimensioned such that, after the mounting, at least one sensor arrangement lies substantially flat on the bearing surface on the inside of the pressure sleeve.

4 Claims, 1 Drawing Sheet

VIBRATION PICKUP COMPRISING A PRESSURE SLEEVE

FIELD OF THE INVENTION

The present invention is directed to a vibration meter having a pressure sleeve.

BACKGROUND INFORMATION

German Patent No 44 03 660 discusses a vibration meter having a pressure sleeve which is used as a knock sensor for monitoring the function of an internal combustion engine in a motor vehicle, This pressure sleeve is fixedly mounted via a bearing surface on the component causing the vibrations, in this case to the engine block of the internal combustion engine.

With this arrangement, the vibrations to be detected are knocking sounds of the internal combustion engine during operation. The sounds are transmitted via the pressure sleeve to a piezoceramic disk as the actual sensor element, which has interposed contact disks and insulating disks allowing the signal pick-up, and in this manner an analyzable output signal is generated.

The manner of mounting or clamping of this sensor arrangement on the pressure sleeve and the mounting of the vibration meter on the vibrating component may have a considerable influence in this case not only on the method of manufacture but also on potential faulty measurements and interferences in operation. In the case of this known vibration meter, the clamping of the sensor element having a plurality of component parts, such as a spring and a seismic mass, is accomplished with a ring nut, for instance, which is capable of being screwed onto a corresponding threat on the pressure sleeve.

When mounting this vibration meter with the aid of an axially acting screw on the component causing the vibrations, the base surface of the pressure sleeve, which is concave from the outside toward the center bore, is pressed onto the surface of the component lying across from it. As a result of this pressure, the bearing surface of the pressure sleeve lying opposite inside, which supports the sensor element, also assumes the same angle at which the bottom surface runs concavely. Thus, a cavity may form between the bearing surface and the sensor arrangement, and here, in particular, the ceramic disk with the insulation and contact disks, in the region lying radially on the inside.

Since compensation for this cavity by elastic deformation of the relatively rigid sensor components is generally minimal, an optimal introduction of the vibrations to the actual sensor arrangement via the pressure sleeve is made more difficult.

SUMMARY OF THE INVENTION

The vibration meter having a pressure sleeve in which the pressure sleeve is mountable under pressure on a component causing vibrations using an initially concave bottom surface is refined according to an exemplary embodiment of the present invention in that the bearing surface for a sensor arrangement, which may be supported on a bearing surface of the pressure sleeve situated inside of and opposite to the bottom surface, prior to mounting, may have a contour, which may run radially inward in a convex manner. The contour of the bearing surface may be dimensioned such that the sensor arrangement lies essentially flat on the bearing surface after mounting.

The bottom surface, which may have the concave contour prior to mounting, may be changed by the pressure of the mounting, usually via a screw guided through the center bore. In an exemplary embodiment, the angles at which the bottom surfaces are concave and the bearing surface is convex, may be approximately identical prior to mounting, in the range of 10° to 20°, for instance, so that they always run in a parallel manner.

In this way, a flat resting surface for the sensor arrangement may also be produced in a particularly advantageous manner after the vibration meter is mounted, due to the described treatment of the bearing surface and the bottom surface. In this case, the essential components of the sensor arrangement for a knock sensor to be used as a vibration meter may be a piezoceramic for generating an electrical signal and a superposed seismic mass, whose surfaces thus may always lie on top of one another in a plan-parallel manner.

DETAILED DESCRIPTION

Figure 1:
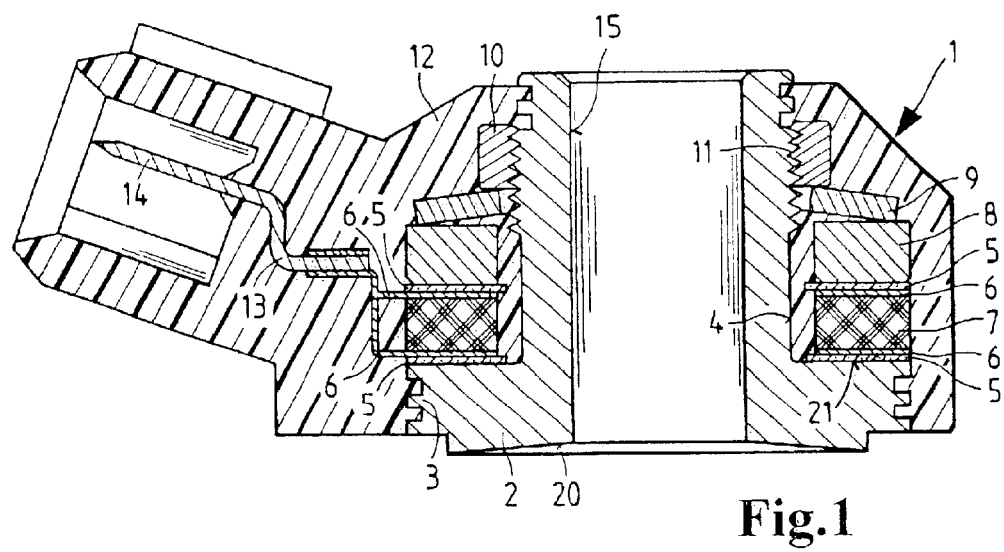
FIG. 1 shows a section through a knock-sensor housing as vibration meter with a pressure sleeve.

FIG. 1 shows a knock sensor as a vibration meter for an internal combustion engine, having an outer plastic housing 1 in which a pressure sleeve 2 may be disposed. In its lower end region, pressure sleeve 2 may have a flange-type collar 3 by which it may rest with its lower bottom surface 20 on the engine block whose vibrations are to be detected.

At outer circumference 4 of pressure sleeve 2, beginning at a lower bearing surface 21 at flange-type collar 3, the following components may be disposed: an insulating disk 5, a first contact disk 6, a piezoceramic disk 7 as the actual sensor element, and above it, a second contact disk 6 as well as a second insulating disk 5. A seismic mass 8, which may be pressed in the direction of piczoceramic disk 7 by an annular spring 9, may be placed on top of this arrangement. Spring 9 may be prestressed by a ring nut 10, which may be screwed onto an outer thread 11 at the upper part of pressure sleeve 2.

In an integrated connector 12 of housing 1, which may be produced by a plastic-injection molding process, electrical terminals 13 for contact disks 6 and plugs 14 may be injection-molded. Plugs 14 may thus be connected to the two contact disks 6, by which an electrical connection to the two sides of piezoceramic disk 7 may be produced via the two contact disks 6, and it may be possible to pick off the electrical voltage generated in response to a pressure load of piezoceramic disk 7 in the axial direction.

A mounting screw may also be guidable through a central opening, or a bore 15, in pressure sleeve 2, by way of which this knock sensor may be mounted, indirectly or directly, as an entity on the engine block of the internal combustion engine. When the knock sensor is mounted, the entire torque exerted by the afore-mentioned mounting screw may be transferred to pressure sleeve 2 via bottom surface 20, that is, no force may be exerted by the mounting on piezoceramic disk 7 as the sensor element.

A prestressing force may be exerted in this case, due to the pressure by spring 9. The prestressing force may be selected such that axial forces come to bear at piezoceramic disk 7 which may be only just tolerable without lasting deterioration of the electrical signal; and these may be also largely independent of thermal expansions and unavoidable compression of pressure sleeve 2 during mounting. The impulses exerted by seismic mass 8 in proportion to the vibrations of the internal combustion engine may be converted to charge impulses in piezoceramic disk 7, which may be analyzable in an appropriate device.

In the example shown in FIG. 1, bottom surface 20 may have a conical shape sloping towards bore 15, so that an elevation may be produced in the outer region of flange-type collar 3. Due to the conical shape of bottom surface 20, pressure sleeve 2 may now be able to be pressed fully against the bearing surface of the engine block.

Figure 2:
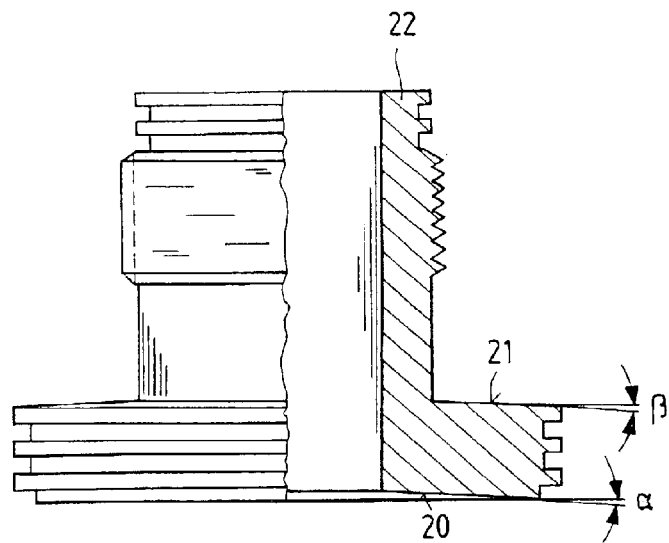
FIG. 2 shows a detailed representation of a pressure sleeve according to an exemplary embodiment of the present invention.

FIG. 2 shows a detailed representation of a pressure sleeve 22 according to an exemplary embodiment of the present invention, in which not only a conical contour of bottom surface 20, but also a correspondingly convex shape of bearing surface 21 may be provided, in a revision of pressure sleeve 2 according to FIG. 1. To optimize the mounting of the entire vibration meter, angle α of the conical contour of bottom surface 20 and angle β of the convex contour of bearing surface 21 may be relatively small, 10° to 20°, for example, steel or brass may be used as the material for pressure sleeve 22. Both angles α and β may be of equal size, so that after mounting, piezoceramic 7 and seismic mass 8 may always be superposed on one another in a plane-parallel manner.

When selecting angles α and β, it may also be important that the conical region of bottom surface 20 comes to lie on the component from the outer edge when the mounting screw is tightened. First, the larger diameter may make contact with the component and then, as the torque of the mounting screw increases, the other areas of the conical area may make contact with the component. In this manner, almost the entire conical area may make contact. The deformation, to which angles α and β need to be adjusted, may be entirely or predominantly in the elastic range of the material used for pressure sleeve 22, so that the conical shape may reform nearly completely once the mounting screw is loosened, due to so-called residual elasticity.

What is claimed is:

1. A vibration meter, comprising:

a pressure sleeve including a bottom surface, the pressure sleeve mountable under pressure on a component causing vibrations, the bottom surface including a first contour which runs radially inward in a concave manner prior to mounting, the first contour changeable by a mounting pressure; and a sensor arrangement supported at an outside of the pressure sleeve under an initial axial stress, the sensor arrangement supported on a bearing surface of the pressure sleeve situated inside of and opposite to the bottom surface;

wherein the bearing surface has a second contour which runs radially inward in a convex manner prior to mounting, the second contour dimensioned so that after mounting at least the sensor arrangement lies approximately flat on the bearing surface.

2. The vibration meter as recited in claim 1, wherein:

the bottom surface runs concavely at a first angle;

the bearing surface runs convexly at a second angle; and the first angle and the second angle are identical prior to mounting.

3. The vibration meter as recited in claim 2, wherein the first angle and the second angle are in the range of about 10° to about 20°.

4. The vibration meter as recited in claim 1, wherein a plurality of additional components are supported at an outside of the pressure sleeve under the initial axial stress.

* * * * *